Jan. 23, 1951 W. D. MacGILLIVRAY 2,538,786

TURNTABLE FOR INSTRUMENT TRAINERS

Filed April 3, 1946 2 Sheets-Sheet 1

Inventor
WILLIAM D. MACGILLIVRAY

BY M. A. Hayes
Attorney

TURNTABLE FOR INSTRUMENT TRAINERS

Filed April 3, 1946 2 Sheets-Sheet 2 inventor
WILLIAM D. MACGILLIVRAY

BY M. A. Hayes
attorney

Patented Jan. 23, 1951

2,538,786

UNITED STATES PATENT OFFICE 2,538,786

TURNTABLE FOR INSTRUMENT TRAINERS

William D. MacGillivray, United States Navy

Application April 3, 1946, Serial No. 659,417

3 Claims. (Cl. 311—33)

(Granted under the act of March 3, 1883, as amended April 30, 1928; 370 O. G. 757)

This invention relates to improvements in table top constructions particularly adapted for use on (Link) instrument trainer desks or tables.

The object of this invention is to facilitate the work of the Link operator by reducing fatigue and increasing his efficiency.

Another object is to construct a rotatable table surface on which the recorder assembly and driving unit of an instrument trainer is operating, to facilitate the work of the operator.

Other and more specific objects will appear in the following detailed description, having reference to the accompanying drawings, wherein.

Figures 1, 3, 5:
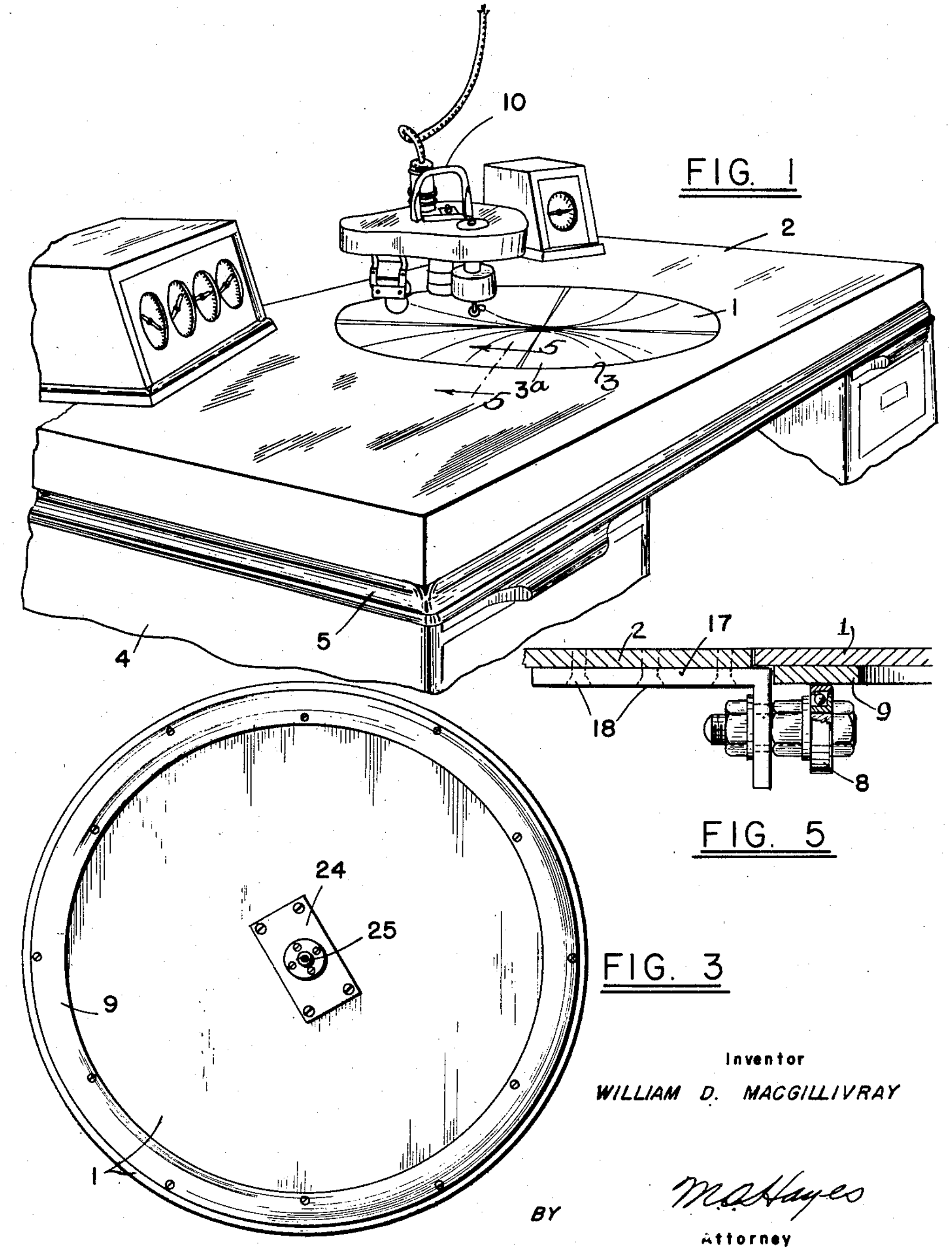
Fig. 1 is a general perspective view of one form of the device made in accordance with the present invention, showing the recorder assembly and driving unit in place thereon.
Fig. 3 is a plan view of the bottom of the turntable showing the pivot bearing and support.
Fig. 5 is a fragmentary view taken on line 5—5 of Fig. 1 showing the bearing bracket.

The structure is a single unit composed of two component parts. One component in the form of device shown in Figs. 1 to 5 is a flat-surfaced turntable 1 of approximately 24 inches in diameter on which is mounted a plotting sheet 3*a*, mounted flush in a corresponding circular cut-out 3 of a rectangular housing 2, which constitutes the second component and is made to fit the top 5 of a conventional work desk or table 4.

The circular turntable 1 is mounted on a single tapered pivot 6 which is attached to the support member 7 of the housing in such a way as to allow the turntable 1 to rotate freely on said pivot. A number of ball bearing rollers 8 are mounted circumferentially within the circular cut-out 3 of the housing in such a way as to support the periphery of the rotary turntable 1. A metal ring 9 may be attached to the circumference of the turntable 1 to act as a track for the supporting rollers 8. The turntable 1 may be provided with a removable plate 24 having a replaceable pivot bearing 25 mounted centrally of the turntable 1 on its under side.

The assembled unit with the turntable 1 installed in the housing is intended to serve as a desk with a flat top, the surfaces of the two components being flush in all respects. The housing is installed in a fixed position whereas the turntable 1 within the housing is free to be turned at will.

The device is designed to be placed on the top of a (Link) instrument trainer desk 4 or to be incorporated as a component part of the (Link) instrument trainer desk, to serve as the desk top proper. In either case, the unit is designed to function as the table on which the recorder assembly and driving unit 10 is placed and operated. Because of the flush characteristics of the surface of this unit, the recorder assembly and driving unit can move or be moved across its entire surface without interference. However, the turntable can be turned around at will while the recorder assembly and driving unit is operating on this component of the device without disturbing the desired tracking characteristics of the recorder. This enables the (Link) instrument trainer operator to observe the path of the recorder assembly and driving unit and to govern the output of signals with greater ease, simply by moving the turntable to a point of best visual advantage with respect to the continuous movement of the recorder.

Figures 2, 4, 6:
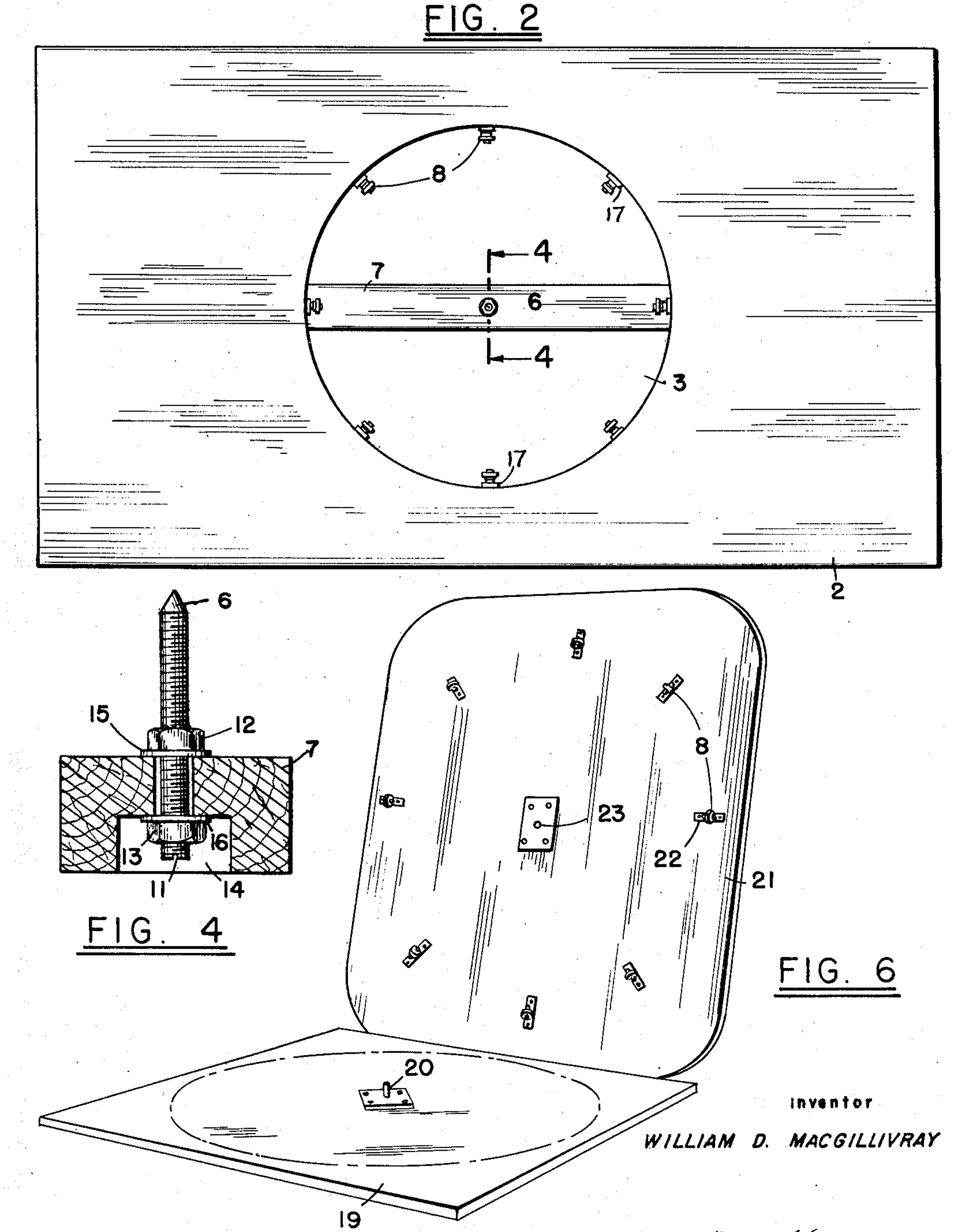
Fig. 2 is a plan view of the housing with the turntable removed.
Fig. 4 is a view taken on line 4—4 of Fig. 2 showing the pivot point and adjusting means.
Fig. 6 is a perspective view of another form of device with the top portion raised off its pivot to show the construction of the device.

The tapered pivot may be made adjustable axially as shown in Fig. 4, by threading it throughout and providing a screwdriver slot 11 in its end. Nuts 12 and 13 are threaded on it on opposite sides of the support member 7 which has a suitable counterbore 14 in its bottom. Washers 15 and 16 are placed between the nuts and the support member.

The rollers 8 used in this form of device may be mounted on brackets 17, as shown in Fig. 5, provided with screw holes 18 for attachment to the underside of the housing 2, as may be seen in Fig. 2.

Fig. 6 shows a modification wherein the base or supporting component is merely a flat sheet 19 having a pivotal pin 20 mounted thereon, and the turntable is a substantially rectangular sheet 21 having rounded corners and a series of supporting rollers 8 mounted on brackets 22 on the under side arranged circumferentially about the pivot bearing 23, so that they will roll on the top of sheet 19.

Various other modifications of this device may be made by varying the details of structure and arrangement without departing from the spirit and scope of this invention as defined in the appended claims.

The invention described herein may be manufactured and used by or for the Government of the United States of America for governmental purposes without the payment of any royalties thereon or therefor.

What is claimed is:

1. A table top comprising a flat-surfaced box with a top wall having a circular cut-out, a circular disc pivotally mounted therein flush with the surface of the box, a bracket member below but extending across said cut-out and fixed to the under side of said top wall, a pivot for said disc mounted on said bracket, and frictionless support means for the periphery of said disc mounted circumferentially in said cut-out.

2. A table top as defined in claim 1, said disc being made of thin sheet meterial, a replaceable reinforcing ring of hard material on the under side of said disc serving as a track for said peripheral support means.

3. A table top as defined in claim 2, said pivot and said peripheral support means being vertically adjustable to level the top of said disc flush with the surface of said top wall.

WILLIAM D. MacGILLIVRAY.

REFERENCES CITED

The following references are of record in the file of this patent:

UNITED STATES PATENTS

| Number | Name | Date |
|---|---|---|
| 791,798 | Kling | June 6, 1905 |
| 847,899 | Brown | Mar. 19, 1907 |
| 895,212 | Tysklind | Aug. 4, 1908 |
| 907,649 | Stover | Dec. 22, 1908 |
| 913,110 | Eccleston | Feb. 23, 1909 |
| 1,114,129 | Gage | Oct. 20, 1914 |
| 1,511,365 | Ramsburg | Oct. 14, 1924 |
| 1,538,037 | Hagemann | May 19, 1925 |
| 1,676,108 | Novak | July 3, 1928 |
| 2,179,663 | Link, Jr. | Nov. 4, 1939 |
| 2,369,922 | Shaman | Feb. 20, 1945 |
| 2,413,300 | Dunn | Dec. 31, 1946 |
| 2,437,243 | Curtis | Mar. 9, 1948 |
| 2,445,546 | Segebaden | July 20, 1948 |
| 2,453,443 | Logan | Nov. 9, 1948 |